B. WELLS.
EGG STEAMER.
APPLICATION FILED OCT. 22, 1908.
936,965.
Patented Oct. 12, 1909.
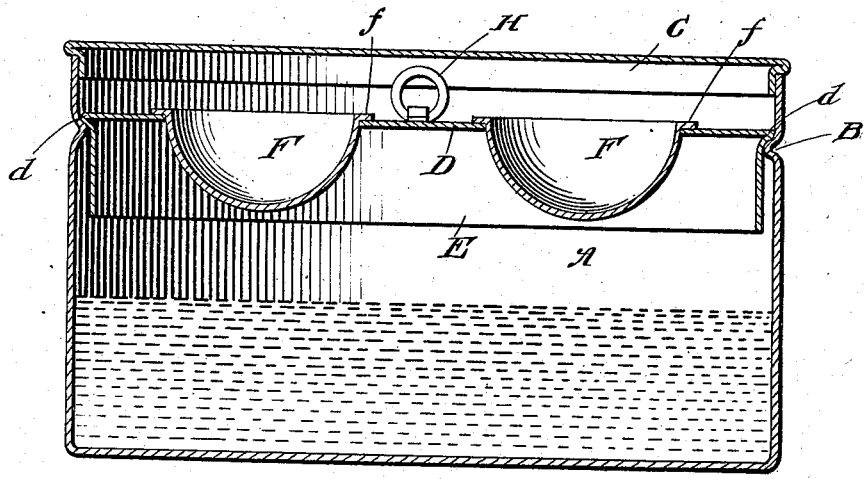
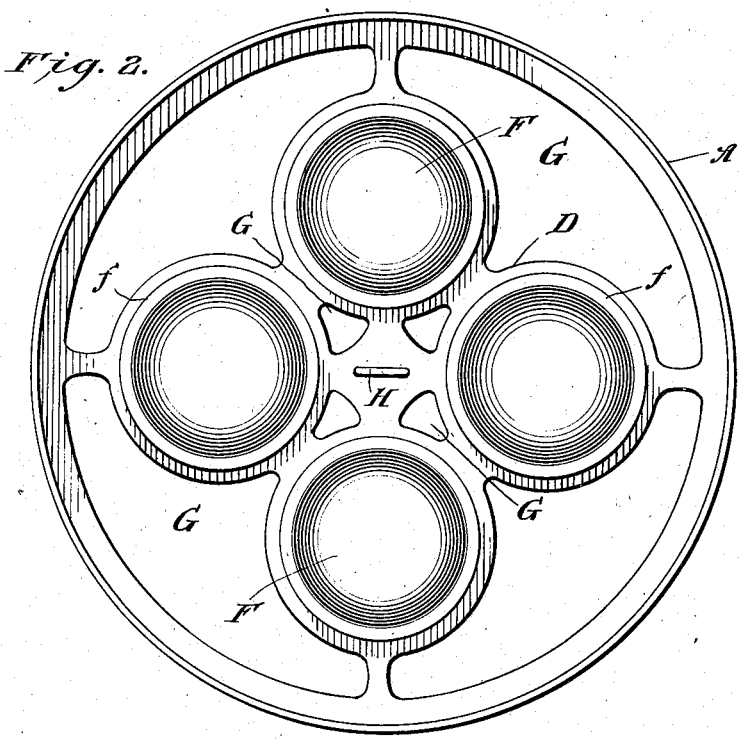
Witnesses
A. A. Olson
W. C. Smith
Inventor
Betty Wells
By Joshua R. H. Potts
Attorney

UNITED STATES PATENT OFFICE.

BETTY WELLS, OF CHICAGO, ILLINOIS.

EGG-STEAMER.

936,965.

Specification of Letters Patent. Patented Oct. 12, 1909.

Application filed October 22, 1908. Serial No. 458,987.

*To all whom it may concern:*

Be it known that I, BETTY WELLS, a citizen of the United States, residing at Chicago, in the county of Cook and State of Illinois, have invented certain new and useful Improvements in Egg-Steamers, of which the following is a specification.

My invention relates to culinary utensils such as are used for cooking food by steaming, my device being especially adapted for steaming or poaching eggs, the object being to provide a closed receptacle for boiling water and an egg holder frame insertible within said receptacle, and adapted to be removed therefrom, this frame carrying separate and independent egg holders and having a flange projecting down thereon below the egg holders which will permit the frame to be removed from the receptacle and placed upon a flat surface without raising the egg holders from their position in the frame.

Another object of my invention is to provide a device of this character wherein steam rising from the boiling water shall circulate entirely around the eggs so that they may be equally cooked on all sides.

The invention consists in the arrangement of parts and details of construction shown in the accompanying drawings and particularly stated in the claims appended.

In the drawings Figure 1, is a diametrical section. Fig. 2, is a plan view of the receptacle with the cover removed but the egg holding frame in place.

A designates a receptacle or boiler cylindrical in plan and having the internal rib B near its upper edge.

C designates a cover fitting in the open upper end of the boiler. The internal rib B I have shown as formed by bending in the metal of the sides of the boiler, but it may be made in any other convenient manner, though this is preferable.

The frame for supporting the egg holders consists of a plate D having the downwardly extending flange E, the holder at the junction of the flange and the plate having a circumferential rib $d$ formed thereon adapted to engage with the rib B so that the egg holding frame is supported thereon. Preferably the rib $d$ is formed by making the flange E slightly smaller in diameter than the plate D, the flange and plate being formed from one piece of metal in the manner shown in Fig. 1, but I do not wish to be limited to this exact construction.

The plate D has circular openings therein into which a set of egg receivers or holders F are located. These holders have outwardly projecting flanges $f$ engaging over the edges of the openings in the egg holding plate. The egg cups or holders F are not so deep as the flange E as shown in Fig. 1, and hence when the frame D is placed upon a table, the cups or holders F will not be forced out. As shown in Fig. 2 the plate D is cut away as at G as much as possible to permit steam from the boiling water in the receptacle to circulate around the upper ends of the eggs.

The central portion of the plate or frame is formed with a ring or handle H whereby it may be raised out of the receptacle or inserted therein. In operation eggs are broken and the contents are placed in the cups or holders, the frame is then placed in the boiler which has previously been placed upon the fire. The steam generated in the boiler will pass up and around the eggs, thus uniformly and entirely cooking the same. When the eggs have cooked a sufficient length of time the frame may be lifted out and the flanges E as before said permit the same to be set upon a flat surface as upon a table without the egg cups or holders contacting with the table and being forced upward.

It is obvious that the eggs may be poached very conveniently in the holders so that the holders might be removed and eggs placed within the openings left for the holders, provided these were small enough to prevent the eggs from falling through.

My device is neat, compact, very simply made and very effective in operation.

Having thus described my invention what I claim as new and desire to secure by Letters Patent is:

An egg cooking utensil comprising a receptacle for boiling water, a cover therefor, the sides of said receptacle being inwardly bent to form an internal rib near the upper edge thereof, in combination with an egg supporting frame comprising a skeleton plate having a downwardly extending circumferential flange of slightly less diameter than said plate and forming therewith an outwardly extending rib, said skeleton plate having openings therethrough in which eggs may be supported, and a series of openings through which steam may pass to the receptacle above the plate, means for lifting said plate and a plurality of egg holders adapted to fit in said openings in the plate and having circumferential flanges for supporting the same, and said circumferential flange extending below the level of the bottoms of said holders to support the same out of contact with the support upon which the device is resting when removed from the receptacle, substantially as described.

In testimony whereof I have signed my name to this specification in the presence of two subscribing witnesses.

BETTY WELLS.

Witnesses:
 ANNA L. EKVALL,
 HELEN F. LILLIS.